(12) United States Patent
Induni et al.

(10) Patent No.: US 9,802,487 B2
(45) Date of Patent: Oct. 31, 2017

(54) SPEEDOMETER DRIVE SYSTEM AND METHOD

(71) Applicant: CLASSIC AUTOMOTIVE INNOVATIONS, LLC, Oregon City, OR (US)

(72) Inventors: Brian Anthony Induni, Oregon City, OR (US); Glenn Andrew Eaton, Coeur D'Alene, ID (US)

(73) Assignee: Classic Automotive Innovations, LLC, Oregon City, OR (US)

( * ) Notice: Subject to any disclaimer, the term of this patent is extended or adjusted under 35 U.S.C. 154(b) by 149 days.

(21) Appl. No.: 15/044,791

(22) Filed: Feb. 16, 2016

(65) Prior Publication Data

US 2016/0263998 A1    Sep. 15, 2016

Related U.S. Application Data

(60) Provisional application No. 62/133,196, filed on Mar. 13, 2015.

(51) Int. Cl.
*B60K 37/00* (2006.01)
*G01S 19/52* (2010.01)
(Continued)

(52) U.S. Cl.
CPC ............. *B60K 37/00* (2013.01); *G01S 19/14* (2013.01); *G01S 19/52* (2013.01); *B60K 2350/1076* (2013.01); *G01C 21/00* (2013.01); *G01S 1/02* (2013.01); *G01S 19/13* (2013.01); *G06F 3/16* (2013.01); *G07C 5/00* (2013.01); *G08B 21/18* (2013.01); *G08G 1/00* (2013.01); *G08G 1/052* (2013.01); *G08G 1/096766* (2013.01); *G08G 1/202* (2013.01); *G10K 11/00* (2013.01); *H04R 3/00* (2013.01)

(58) Field of Classification Search
CPC .... G08G 1/00; G08G 1/202; G08G 1/096766; G08G 1/052; G07C 5/00; G08B 21/18; G06F 3/16; G10K 11/00; H04R 3/00; G01C 21/00; G01S 1/02; G01S 19/52; G01S 19/13; G01M 3/00; B63G 8/00; B63G 8/001; G01N 27/20; B63C 11/40; B60K 37/00; B60K 37/02; G01P 3/495; G01P 3/42; G01P 3/4953; G01P 1/08; G01P 1/02

See application file for complete search history.

(56) References Cited

U.S. PATENT DOCUMENTS 4,796,210 A * 1/1989 Dubuisson ............ G01P 3/4953
324/163
5,001,930 A * 3/1991 Glover .................. B60K 37/02
116/62.1

(Continued)

*Primary Examiner* — Behrang Badii
(74) *Attorney, Agent, or Firm* — Erise IP, P.A.

(57) ABSTRACT

A speedometer system is disclosed that replaces reliance on the feedback from a vehicle transmission and instead tracks the vehicle speed from an external source. In some embodiments, a global positioning unit (GPS) is connected to a microcontroller that drives an electric motor to turn and display a speed for an improved speedometer reading. The speedometer system further including a calibration unit that allows for the manipulation of the electric motor to display a predetermined calibration speed on the speedometer.

12 Claims, 5 Drawing Sheets

(51) Int. Cl.

| | | |
|---|---|---|
| *G01S 19/14* | (2010.01) | |
| *G01S 19/13* | (2010.01) | |
| *G07C 5/00* | (2006.01) | |
| *G06F 3/16* | (2006.01) | |
| *G08G 1/052* | (2006.01) | |
| *G01S 1/02* | (2010.01) | |
| *G08B 21/18* | (2006.01) | |
| *G08G 1/0967* | (2006.01) | |
| *G01C 21/00* | (2006.01) | |
| *G10K 11/00* | (2006.01) | |
| *G08G 1/00* | (2006.01) | |
| *H04R 3/00* | (2006.01) | |

(56) References Cited

U.S. PATENT DOCUMENTS

| | | |
|---|---|---|
| 5,485,161 A | 1/1996 | Vaughn et al. |
| 5,525,998 A | 6/1996 | Geier et al. |
| 5,828,987 A | 10/1998 | Tano et al. |
| 5,912,635 A | 6/1999 | Oshizawa et al. |
| 5,917,434 A | 6/1999 | Murphy |
| 6,029,111 A | 2/2000 | Croyle et al. |
| 6,087,965 A | 7/2000 | Murphy |
| 6,353,781 B1 | 3/2002 | Spivak |
| 6,708,115 B1 | 3/2004 | Nagasaka et al. |
| 7,183,942 B2 | 2/2007 | Rock et al. |
| 8,275,509 B2 | 9/2012 | Fritsch et al. |
| 8,653,953 B2 | 2/2014 | Biondo et al. |
| 2005/0203703 A1 | 9/2005 | Chang |
| 2008/0082265 A1 | 4/2008 | Chen et al. |
| 2008/0306687 A1 | 12/2008 | Ryu et al. |
| 2014/0005928 A1 | 1/2014 | Giannetta et al. |
| 2014/0152469 A1 | 6/2014 | Davito |
| 2014/0225754 A1* | 8/2014 | McCord .............. G01S 19/52 340/984 |
| 2014/0279587 A1 | 9/2014 | Gafford |

\* cited by examiner

SPEEDOMETER DRIVE SYSTEM AND METHOD

CROSS REFERENCE TO RELATED APPLICATIONS

This application claims the benefit of U.S. Provisional Application No. 62/133,196, filed Mar. 13, 2015, the entity of which is incorporated by reference herein.

BACKGROUND

In some vehicles, such as boats, automobiles, motorcycles, etc., speedometers are driven mechanically by a cable connected to a vehicle's transmission. When the vehicle is in motion, a speedometer gear assembly turns a speedometer cable, which then turns the speedometer mechanism itself. Typically, a small permanent magnet affixed to the speedometer cable interacts with a small aluminum cup or "speedcup" attached to the shaft of the pointer on the speedometer instrument. As the magnet rotates near the cup, the changing magnetic field produces eddy currents in the cup, which themselves produce another magnetic field. The effect is that the magnet exerts a torque on the cup, "dragging" it, and thus the speedometer pointer, in the direction of its rotation with no mechanical connection between them.

The pointer shaft is held toward zero by a fine torsion spring. The torque on the cup increases with the speed of rotation of the magnet. Thus an increase in the speed of the vehicle will twist the cup and speedometer pointer against the spring. The cup and pointer will turn until the torque of the eddy currents on the cup is balanced by the opposing torque of the spring, and then stop. Given the torque on the cup is proportional to the vehicle's speed, and the spring's deflection is proportional to the torque, the angle of the pointer is also proportional to the speed, so that equally spaced markers on the dial can be used for gaps in speed. At a given speed the pointer will remain motionless and pointing to the appropriate number on the speedometer's dial.

The return spring is calibrated such that a given revolution speed per minute (rpm) of the cable corresponds to a specific speed indication on the speedometer. This calibration must take into account several factors, examples include: ratios of the tailshaft gears that drive the flexible cable, the final drive ratio in the differential, and the diameter, pressure, and temperature of the driven tires.

Over time, the accuracy of these speedometers can degrade. In addition, varying tire sizes, changing drive system gear ratios, and aging mechanical systems can affect the accuracy of the speedometer, as many are factors taken in account when calibrating. A driver may be unaware of the inaccuracy of the speedometer and may drive the vehicle faster than what the driver thought due to reliance on the inaccurate speedometer reading. This can result in expensive and unnecessary speeding violations.

As may be appreciated, speedometer readings also affect the odometer. In instances where a speedometer is reading higher than it should, the odometer may be registering higher mileage than the vehicle has actually traveled. Higher odometer readings may decrease the value on a vehicle thus costing the owner sunk costs from the accelerated depreciated value in a sale of the vehicle.

Solutions such as recalibrating the speedometer or adjusting gear ratios are vehicle dependent and require significant time, effort, and expertise. These solutions run the risk of disrupting or harming other components in the engine and can potentially disrupt the current speedometer system. Even so, these solutions can become obsolete as soon as a relevant change in the system is made. Furthermore, adjusting gear ratios is not an exact science, thereby resulting in only a close correction of the speedometer reading.

A need therefore exists for a method and system to provide a speedometer reading for a mechanically driven speedometer that sustains an accurate speedometer performance longer than the prior art.

BRIEF SUMMARY OF THE INVENTION

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

Embodiments of the present invention provide a speedometer reading based on readings external to the vehicle providing an accurate speedometer performance. Broadly, embodiments of the subject technology provide a standalone unit that drives the speedometer of a vehicle in place of the vehicle transmission. In an exemplary embodiment, the subject technology may utilize a vehicle's original mechanical speedometer (i.e. pre-1985), keeping the original look (and value) intact while improving the accuracy of the original speedometer unit. Embodiments utilize GPS and software & circuitry to spin an electric motor which in turn drives the speedometer to read the correct speed. The subject technology also utilizes a temporary calibration unit to set the whole speedometer drive system to be correct for the specific vehicle.

A speedometer system comprises a connection configured for receipt of a speedometer cable coupled to a speedometer of a vehicle. An electric motor may be coupled to the connection and driven by a signal received via a circuit board. A global positioning system (GPS) receiver may be coupled to the circuit board. The circuit board may drive the electric motor at a speed that correlates to a GPS read speed of the vehicle indicated by the GPS receiver. The speedometer is driven to match the GPS read speed of the vehicle.

In one embodiment a speedometer system comprises a housing having a connection, the connection coupled to a speedometer of a vehicle; an electric motor coupled to the connection; and a speed information source communicating speed information of the vehicle with a microcontroller, the microcontroller driving the electric motor to spin the electric motor at a correlated revolutions per minute, the correlated revolutions per minute correlates with the speed information of the vehicle, and wherein the speedometer displays a speed of the vehicle from the correlated revolutions per minute of the electric motor.

In one embodiment the connection is configured for receipt of a speedometer cable, the speedometer cable being connected directly to the speedometer of the vehicle. This includes the step of removing speedometer cable from vehicle transmission and connecting speedometer cable to speedometer module after the module has been mounted.

In one embodiment, the speed information source is a global positioning system subassembly having a global positioning system receiver in communication with a global positioning system source, i.e. satellite, the global positioning system subassembly being connected to the microcontroller for communicating therewith, the global positioning system receiver receiving speed information of the vehicle from the global positioning system source. In another embodiment, the global positioning system source will communicate location information to the global positioning system receiver; the receiver will calculate speed information from location information received from a global positioning system source. The global positioning system subassembly may further include a global positioning system antenna in communication with the global positioning system receiver and the global positioning system source, wherein the antenna receives information (speed, location, etc.) of the vehicle from the global positioning system source and transmits the information of the vehicle to the global positioning system receiver.

In another embodiment, the speedometer system includes a gear box, the gear box being connected to the electric motor on a first end and the connection on a second end, such that the correlated revolutions per minute of the electric motor is reduced by the gear box.

In another embodiment, the speedometer system includes a rotary encoder, the rotary encoder being connected with the electric motor and the microcontroller, the rotary encoder measures revolutions per minute of the electric motor and communicates this in feedback to the microcontroller.

The speedometer system may be powered via a power source being at least one of vehicle power input, vehicle wiring, vehicle accessory assembly, and a battery.

In another embodiment, the speedometer system includes a calibration unit, the calibration unit being in connection with the microcontroller that communicates to the electric motor to spin to a pre-set revolutions per minute, and wherein the calibration unit allowing for the manipulation of revolutions per minute of the electric motor to a calibrated revolutions per minute. The speedometer system comprising memory for saving information of the calibrated revolution per minute. In another embodiment, the calibration unit is wirelessly connected to electric motor.

In another embodiment, the speedometer system includes a plastic cap, the plastic cap covering a connection point on the vehicle, the connection point being located where the speedometer cable was coupled to the vehicle.

The drawings constitute a part of this specification and include exemplary embodiments of the present invention and illustrate various objects and features thereof.

BRIEF DESCRIPTION OF THE DRAWINGS

The detailed description of some embodiments of the invention is made below with reference to the accompanying figures, wherein like numerals represent corresponding parts of the figures. A further understanding of the invention may be had by reference to the accompanying drawing in which.

DETAILED DESCRIPTION OF CERTAIN EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. It is also noted that any reference to the words top, bottom, up and down, and the like, in this application refers to the alignment shown in the various drawings, as well as the normal connotations applied to such devices, and is not intended to restrict positioning of the connecting member assemblies of the application and cooperating bone anchors in actual use.

Figure 1:
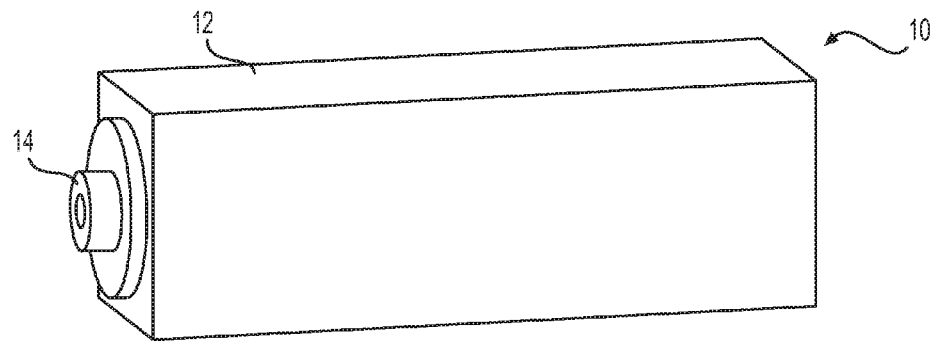
FIG. 1 is a perspective view of a speedometer drive module according to an embodiment of the present invention.
Figure 2A:
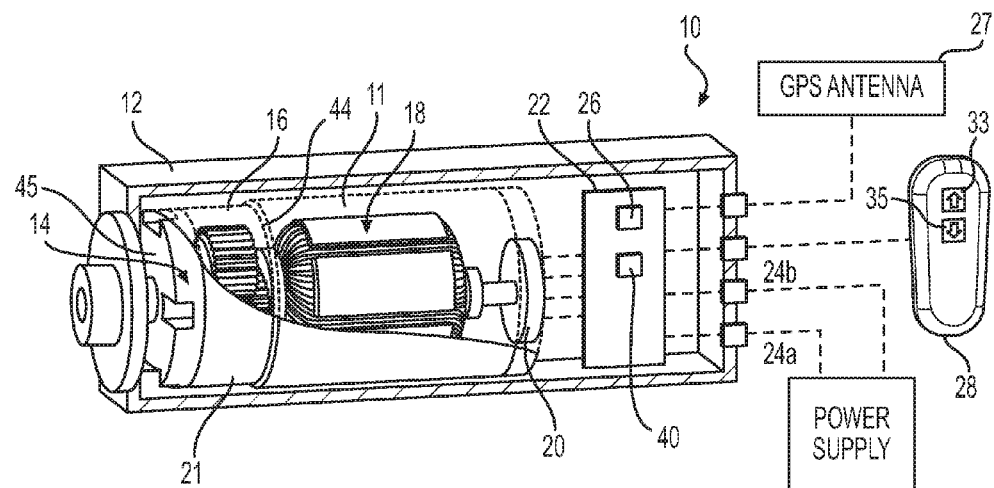
FIG. 2A is a perspective view of the module of FIG. 1 with portions shown in cross-section and portions of the electric motor subassembly broken away.
Figure 3A:
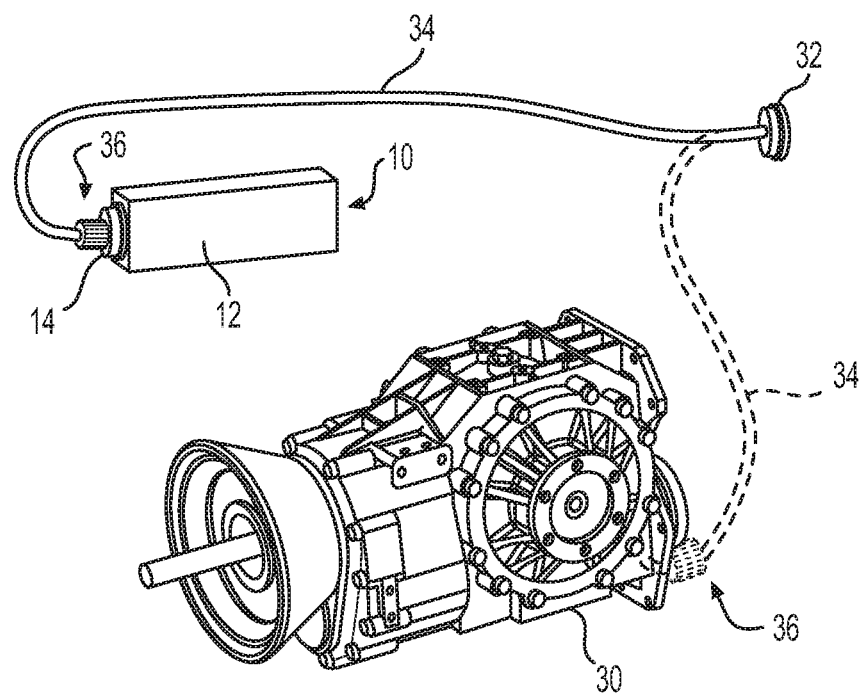
FIG. 3A is a schematic view of a speedometer drive system demonstrating rewiring of an vehicle according to an embodiment of the present invention.

The embodiments herein relate generally to a system and method of a speedometer module which may be retrofit to mechanically driven vehicle speedometers. Referring now to FIGS. 1, 2A, and 3A, a speedometer drive module 10 (referred to generally as the module 10) is shown in accordance with an exemplary embodiment of the subject technology. The module 10 generally includes a housing 12 and a speedometer cable connection 14 for receiving a speedometer connection 36 of a speedometer cable 34. It is foreseen that the housing 12 may include shielding that blocks radio frequency electromagnetic radiation, coupling of radio waves, electromagnetic fields, and electrostatic fields. The speedometer cable 34 typically coupled between a transmission 30 and a speedometer 32 (FIG. 3A). However, instead of the transmission 30 driving the speedometer 32, the module 10 may drive the speedometer 32 with improved accuracy to a vehicle's actual speed and mileage. The module 10 includes an electric motor assembly 11.

Figure 2B:
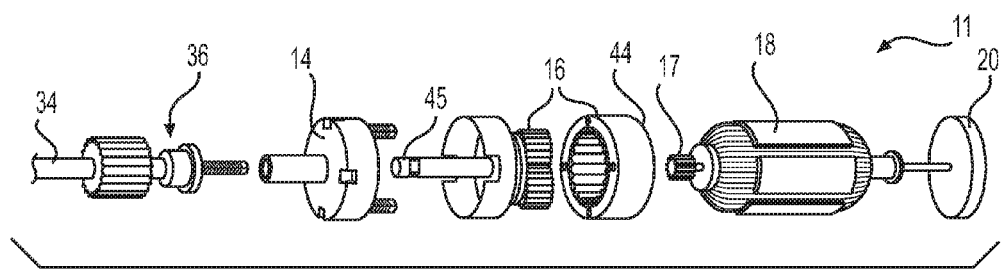
FIG. 2B is an exploded view of the electric motor assembly of FIG. 2A and the speedometer cable according to an embodiment of the present invention.
Figure 4:
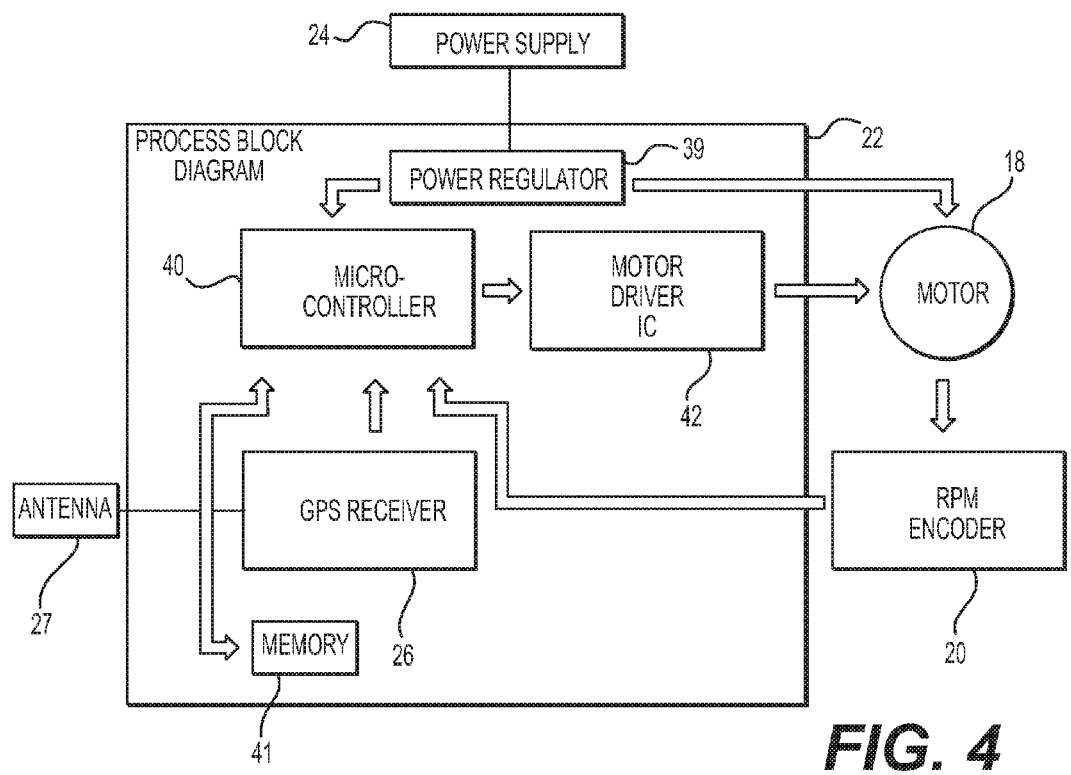
FIG. 4 is a block diagram of the method of communication with the electric motor according to an embodiment of the present invention.

Referring now to FIGS. 2A-2B, the electric motor assembly 11 may include a housing 21, a gearbox 16 coupled to an electric motor 18, and a rotary or rpm encoder 20. The electric motor 18 converts electric signals to a mechanic armature 17 into the gearbox 16. The module 10 may also include a Global Positioning System (GPS) receiver 26 and GPS antenna 27, the GPS antenna 27 receiving location data from GPS sources (not shown) and the GPS receiver 26 communicating with a microcontroller 40 (FIG. 4) correlating the location data into actual speed of the vehicle. It is foreseen that GPS sources may transmit the speed information of the vehicle rather than location information among other information. It is envisioned that the GPS source will transmit speed or location information to the antenna at a rate of 1 Hz, but it is foreseen that this may be in a range of 0.1 Hz to 1 kHz. The GPS receiver 26 and microcontroller may be integrated into a circuit board 22 as seen in FIG. 4. The circuit board 22 may be configured to read or convert the GPS location information into speed information of the vehicle by the GPS receiver 26 (FIG. 4) and communicate to the microcontroller to further convert speed information to a revolutions per minute (rpm), this rpm conversion being communicated as a signal (such as a pulse width modulation (PWM), pulse duration modulation (PDM), direct torque control (DTC), delta sigma modulation, or any known methods of communicating to an electric motor 18) to the motor drive integrated circuit 42 to drive the electric motor 18, as will be further discussed below. The electric motor 18 drive signal (FIG. 4) is transformed to a mechanical revolution per minute (rpm) of the armature 17 to the speedometer 32 through the speed or revolution reducing gearbox 16 that drives the speedometer connection cable 34 (FIG. 3A) to spin and produce an rpm that correlates with the actual speed of the vehicle received from the GPS antenna 27. The spin of the speedometer connection cable 34 driving the attached speedometer 32 to read the speed of the vehicle.

It is foreseen that the GPS antenna 27 may be a part of the circuit board 22, rather than external to the module. It is also foreseen that the rotary encoder 20 may drive the electric motor 18.

The various elements in the module 10 may be powered via a power source 24, such as a battery, vehicle battery, vehicle accessory unit, vehicle power input typically using a 12 Volt DC input with a live and ground connection 24a, 24b, respectively, or any other power source known. As may be appreciated, the module 10 thus avoids the degrading signal quality read from wearing mechanical parts in conventional vehicle drive systems and instead utilizes an external signal to measure the vehicle's speed and drive the speedometer 32 with more accurate speed based on location data.

Referring to FIG. 3A, the speedometer cable connection 36 is removed from the vehicle transmission 30 and connected to the module 10. Mounting the module 10 includes locating a suitable place in the vehicle, reasonably protected away from road hazards, extreme heat, and excessive moisture, i.e. engine bay, under dashboard, trunk, etc. A switched or un-switched supply of 12 volt DC from the vehicle's wiring system may be connected to the module 10 (positive 24a to the red wire lead, and ground or negative 24b to the black wire lead) as the power source 24. It is foreseen that GPS receiver 26 may be external and if so, an appropriate place to mount the GPS receiver 26 should be found and a cable lead (not shown) should be routed from the receiver 26 to controller circuit board 22.

Figure 3B:
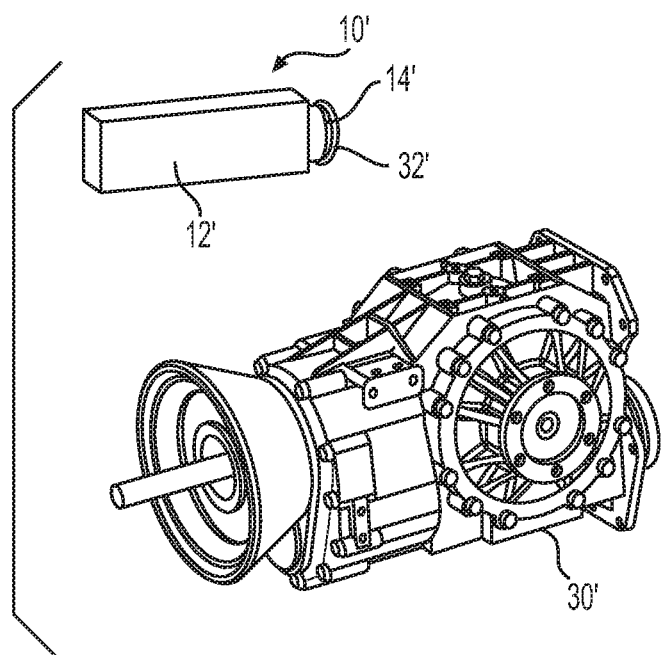
FIG. 3B is a schematic view of a speedometer drive system demonstrating rewiring of an vehicle according to second embodiment of the present invention.

Referring to FIG. 3B, the module 10' is directly connected to the speedometer 32. The speedometer cable 34' is removed in this embodiment. As a result, the module 10' may be screwed directly to the back of the speedometer. It is foreseen that in this embodiment, the module 10' may comprise the same configuration as the first embodiment's unit 10, or it may necessitate separating out the motor housing from the electronics, and connecting these two pieces together via a cable (not shown). The housing that has the motor (not shown) in it being the piece that would connect directly to the back of the speedometer. It is foreseen that this embodiment may be best suited for vehicles where there is sufficient room/clearance behind the dashboard-mounted mechanical speedometer 32'. As such, this embodiment removes the need for the unit 10' to be mounted in the engine bay (not shown) or somewhere apart from the speedometer 32' itself. It is foreseen that the electric motor (not shown) may directly communicate an eddy current signal to the speedometer in lieu of the speedometer cable 34 and that a current sensor may provide feedback to the microcontroller.

Figure 3C:
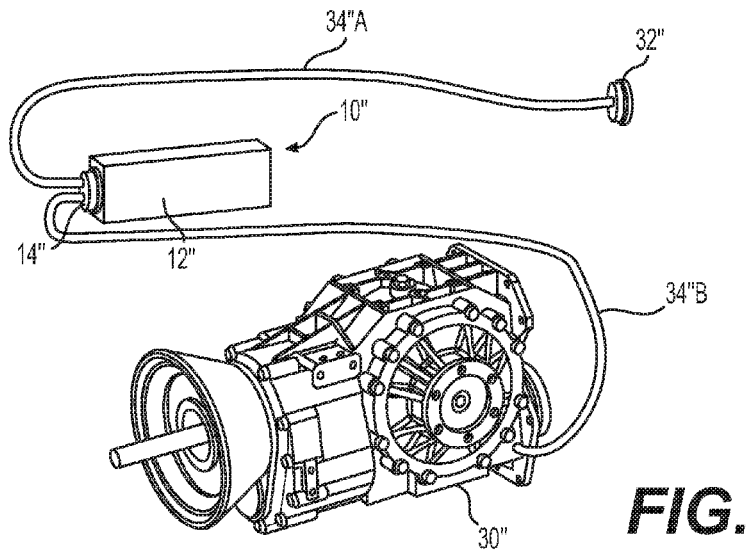
FIG. 3C is a schematic view of a speedometer drive system demonstrating rewiring of an vehicle according to third embodiment of the present invention.

Referring to FIG. 3C, a module 10" may be directly connected to the transmission 30" by speedometer cable 34"B and to the speedometer 32" by speedometer cable 34"A. In this configuration, it is foreseen that the transmission rpm may drive the speedometer cable 34"B and this rpm would be equally transmitted through 34'A only in times of power or GPS communication loss. At all other times, it is foreseen that the speedometer 32" would be driven by the electric motor 18 of the module 10", as described above, and the transmission rpm would be circumvented.

Referring to FIG. 4, a process diagram is illustrated for the transmission of the speed information to the output of rpms of the speedometer cable 34 to the speedometer 32. In the illustrated embodiment, the circuit board 22 includes a power regulator 39, a GPS receiver 26, memory 41, and a motor driver integrated circuit 42. The power regulator 39 takes input voltage from the power supply 24 and outputs or delivers the appropriate voltage at an appropriate level and consistency to the electric motor 18 and to the microcontroller 40 to enable the devices 18, 40 to function properly. It is foreseen that this may also include noise suppression, transient impulse protection, and power factor correction circuitry. The GPS antenna 27 receives information (i.e. speed or location) from the GPS source as explained above. The GPS receiver 26 communicates the information to the microcontroller 40. As by means of an example, this information exchange may be speed information in knots, which is transmitted from the GPS source to the GPS antenna 27 to the GPS receiver 26, then the speed information (i.e. knots) is converted to a miles per hour (mph) or kilometers per hour (kph) through known mathematical ratios by the GPS receiver 26. The mph calculated is converted to a PWM, i.e. 17 mph could be equivalent to a 20 PWM by the microcontroller 40. This conversion is dependent upon the speedometer being used and is calculated from initial calibration, as will be further described below. The microprocessor 40 communicates with the motor driver integrated circuit 42 to run the motor 18 at the calculated PWM, i.e. 500 rpm based on the speed information given. The communicated PWM drives the electric motor 18 to spin the armature 17. The armature 17 being connected to a sun and planet gearbox 16 at one end 44. The gearbox 16 being connected to the speedometer cable 34 at the opposed end 45, the gearbox reducing the spin of the armature 17 to a lower spin rpm for the speedometer cable 34 that is connected to the speedometer 32. The rotary encoder 20 acts as a detector or sensor to transmit the rate of spin in the form of a PWM back to the microcontroller 40. The microprocessor 40 communicates in feedback with the rotary encoder 20 at a predetermined time (i.e. every second, half second, etc.) and checks for the number of pulses generated in that predetermined time. The microprocessor then compares those pulses communicated from the rotary encoder 20 to the required number of pulses needed based on the calibration settings and if necessary adjusts the outputted PWM to the electric motor 18. It is foreseen that the rotary encoder 20 may communicate actual rpm of the electric motor 18 to the microcontroller 40. The electric motor 18 is envisioned to be a motor of main frequency between 1 Hz to 50 Hz, preferably between 10 Hz and 20 Hz.

It is foreseen that if there is a loss in GPS source communication, then the microcontroller 40 communicates to the electric motor 18 to maintain an average speed calculated from last known speed information until communication is reconnected, i.e. when passing through a tunnel. It is foreseen that a predetermined number of speed information will be averaged to output the average speed. It is also foreseen that if there is a loss in GPS source communication, then the microcontroller may just maintain a predetermined set speed, i.e. 30 mph, until communication is back up.

Referring to FIG. 2A, a handheld calibration unit 28 may be connected to the module 10 to perform calibration. It is foreseen that the connection of the calibration unit 28 and module 10 may be made via known wireless protocols, such as IEEE 802.11, Bluetooth, RFID or wired protocols such as USB, USB 2.0, Firewire, etc. When the calibration unit 28 and module 10 are connected, the module 10 may automatically enter calibration mode. It is also foreseen that if the module 10 is connected to the vehicle wiring, and the calibration unit 28 is connected to the module 10, then by turning the vehicle ignition on, but not necessarily starting the engine, the calibration mode may initiate. The microcontroller 40 detects that the calibration unit 28 is connected and in the calibration mode drives the electric motor 18 to a predetermined PWM. It is foreseen that this predetermined PWM should be somewhere between in the middle of the minimum and maximum PWM possible for the electric motor 18, to allow for adjustment up and down. The electric motor 18 spins and the speedometer 32 should display a speed. This speed being displayed is determined by the individual speedometer 32 and will likely be different with each speedometer. The calibration unit 28 may be used to adjust the speed or speedometer reading up or down using the buttons 33, 35 until a predetermined calibration speed is displayed. The predetermined calibration speed is foreseen to be determined by the manufacturer of the module 10. The calibration information may be stored on memory 41, such as an EPROM or EEPROM chip of the circuit board 22. It is foreseen that the speed displayed may need to be stable for a predetermined set time period before disconnection of the calibration unit 28, to allow the EPROM to save and avoid possible fluctuations in the electric motor 18. The calibration unit 28 may be disconnected from the module 10 triggering the module 10 to enter an operational mode, ready for use when the vehicle is driven.

In an example, if the microcontroller 40 drives the electric motor to 100 PWM and the predetermined calibration speed is 40 mph, but the displayed speed is 20 mph, then a user will adjust the displayed speed until it is 40 mph. This will calibrate the microcontroller to be able to determine further speeds if 100 PWM plus some offset from the manually adjusted calibration is equivalent to 40 mph.

It is understood that the calibration will be set, even if for example, the tires are changed or parts of the engine changed out. The calibration may need to repeat if the module 10, speedometer 32, or speedometer cable is ever moved, dislodged or changed.

Figure 5:
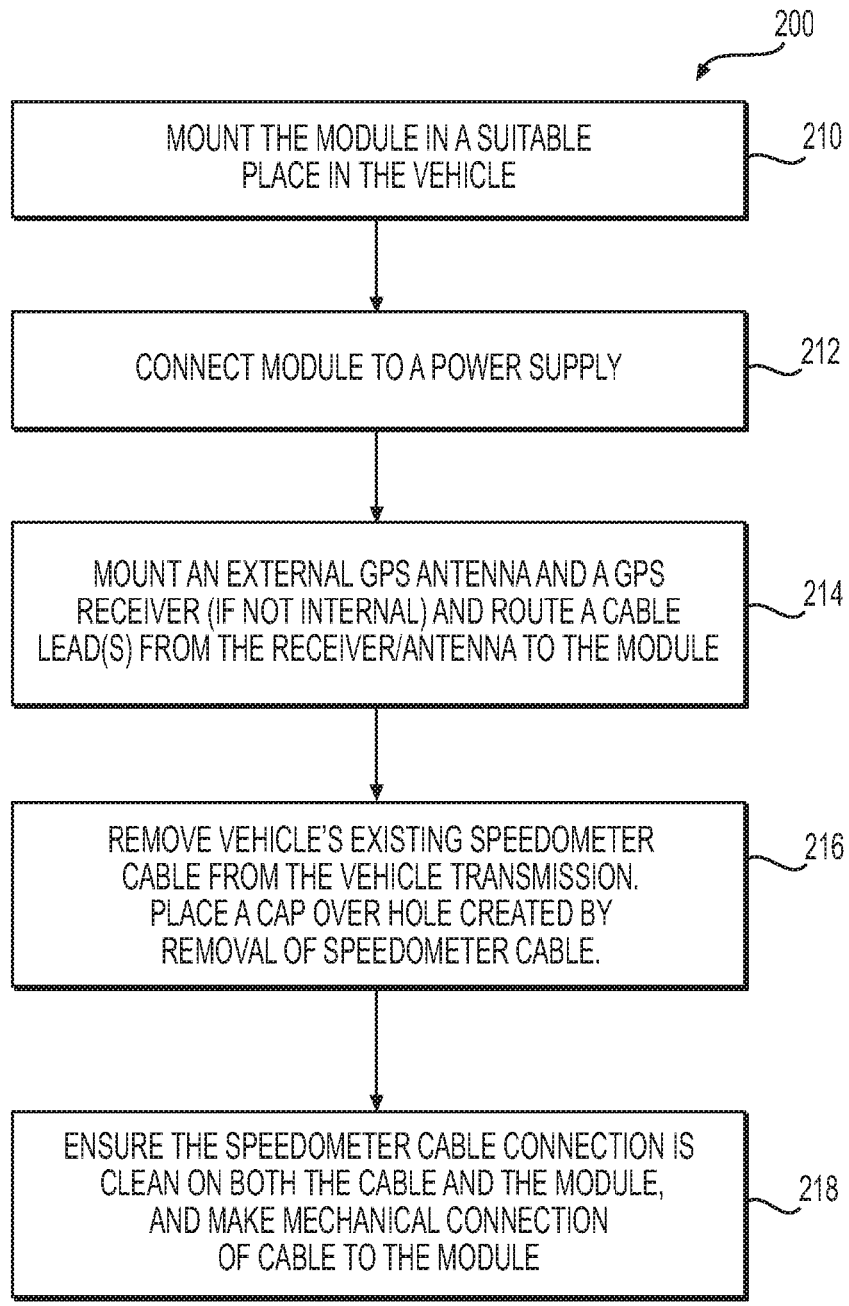
FIG. 5 is a flowchart for a method of mounting a speedometer drive module and rewiring a speedometer cable from a transmission to a speedometer drive module according to an embodiment of the present invention.

Referring to FIG. 5, a method 200 of mounting a speedometer drive system and rewiring a speedometer cable 34 from a transmission 30 to a speedometer drive module 10 is illustrated. At step 210, the module 10 is mounted in a suitable place in the vehicle that is reasonably protected away from road hazards, extreme heat, and excessive moisture, i.e. engine bay, under dashboard, trunk, etc. At step 212, the module 10 is connected to the power supply 24. At step 214, the GPS antenna 27 and the GPS receiver 26 are mounted to a suitable location, and the cable lead(s) from GPS receiver 26 and GPS antenna 27 are connected to the module 10 via an applicable connection point.

At step 216, the existing vehicle speedometer cable 34 is disconnected from the vehicle transmission 30. It is foreseen that this is done by unscrewing, unclipping, or unbolt locking the cable from a connection point on the vehicle transmission 30. Optionally, a plastic cap (not shown) may cover the exposed connection point on the transmission for the purposes of reducing oil runoff. At step 218, the speedometer cable 34 is to be routed or connected to the module 10. It is foreseen that a user may ensure the speedometer cable connection 14 is clean on both the cable 34 and the module 10 before making the mechanical connection. This may be a screw, clip, or bolt on connection depending on the vehicle.

Figure 6:
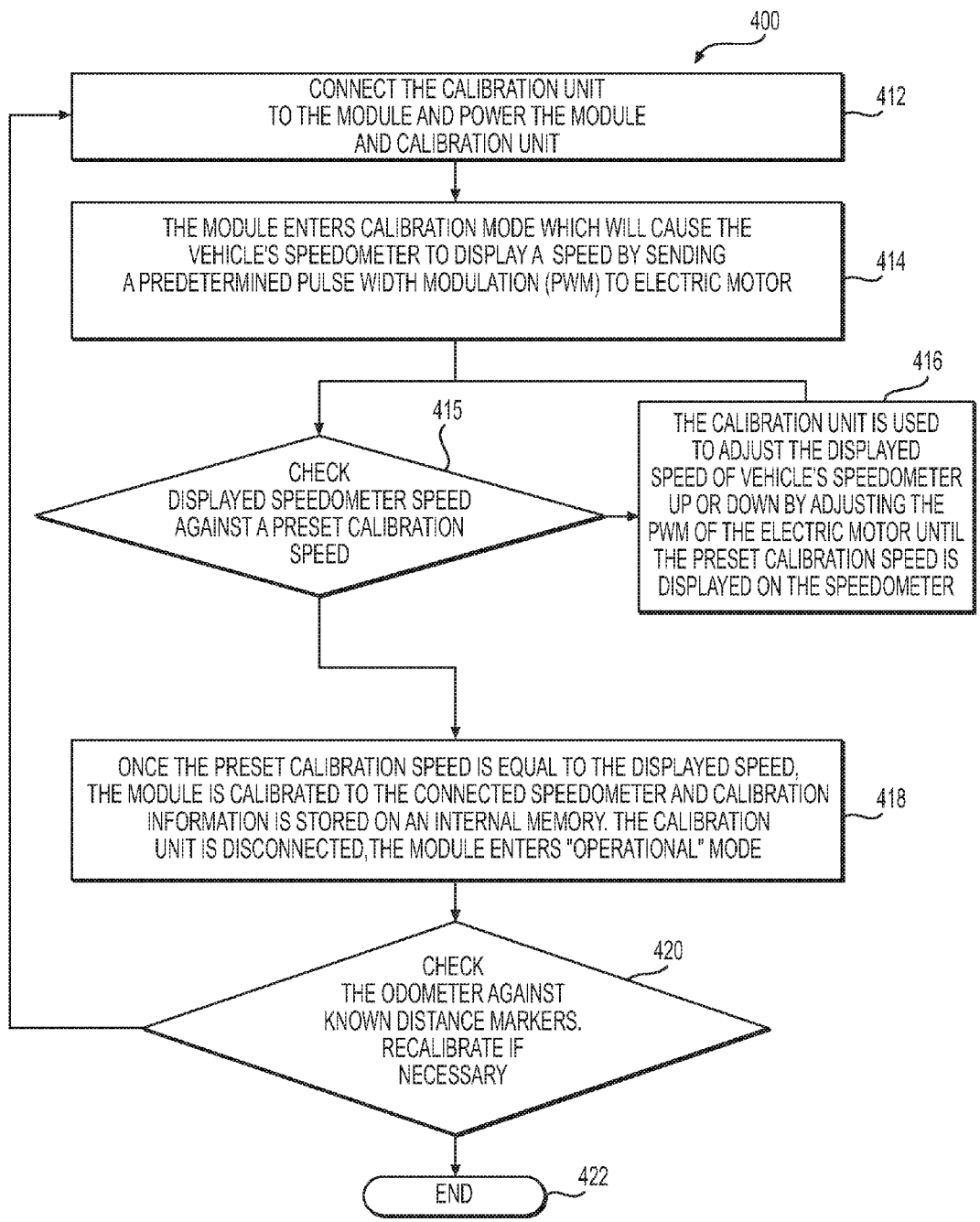
FIG. 6 is a flowchart for a method of calibrating a speedometer drive module to a speedometer according to an embodiment of the present invention.

Referring to FIG. 6, a method 400 of calibrating a speedometer drive module 10 to a speedometer 32 is illustrated. At step 412, a hand held calibration unit 28 is connected to the module 10. It is foreseen that the calibration unit may be powered by the module 10 and the module 10 may be powered by the power source, such as the vehicle wiring assembly, therefore, switching the vehicle ignition to 'on' setting will turn on the module 10 and the calibration unit. It is foreseen that this connection may be wireless connected through known wireless protocols, such as IEEE 802.11, Bluetooth, and RFID. It is foreseen that the calibration method 400 will not require power from the engine, as the module 10 may be powered by a different power source 24.

At step 414, the module 10 enters a calibration mode. It is foreseen that the module 10 may recognize the connection to the calibration unit 28 and immediately enter calibration mode. In calibration mode, it is foreseen that the microcontroller will send a predetermined PWM to the electric motor 18. The electric motor 18 will initiate the speedometer to display a speed on the speedometer 32. At step 415, the displayed speed will be checked against the predetermined speed. If the predetermined calibration speed does not equal the displayed speed, then at step 416, the calibration unit 28 may be used to adjust the speedometer reading up or down using buttons 33, 35 until the speedometer 32 reads the predetermined calibration speed. At step 418, the calibration information is stored to the module 10 and the calibration unit 28 is removed from the module 10. It is foreseen that the calibration information is saved on the circuit board 22 via an internal memory 41, EPROM, EEPROM, RAM, or the like. It is foreseen that the module 10 will enter into operational mode once the calibration unit is unplugged. At step 420, the odometer may be tested with distance markers, hand-held GPS device, etc., to validate that the speedometer is correctly displaying the correct speed. If not displaying the correct speed, then the method 400 is repeated at step 412, otherwise the calibration method is ended at step 422.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. Further, it will be understood that certain features and subcombinations may be of utility and may be employed within the scope of the disclosure. Further, various steps set forth herein may be carried out in orders that differ from those set forth herein without departing from the scope of the present methods. This description shall not be restricted to the above embodiments.

It is to be understood that while certain forms of the present invention have been illustrated and described herein, it is not to be limited to the specific forms or arrangement of parts described and shown.

What is claimed is:

1. A speedometer system, comprising:
a housing having a connection, the connection coupled to a speedometer of a vehicle;
an electric motor coupled to the connection;
a speed information source communicating speed information of the vehicle with a microcontroller, the microcontroller driving the electric motor to spin the electric motor at a correlated revolutions per minute, the correlated revolutions per minute correlates with the speed information of the vehicle, and wherein the speedometer displays a speed of the vehicle from the correlated revolutions per minute of the electric motor;
mounting the speedometer;
removing at least a portion of speedometer cable from vehicle transmission and connecting speedometer cable to speedometer;
the connection is configured for receipt of a speedometer cable, the speedometer cable being connected directly to the speedometer of the vehicle;
the speed information source is a global positioning system subassembly having a global positioning system receiver in communication with a global positioning system source, the global positioning system receiver being connected to the microcontroller, the global positioning system receiver determining speed information of the vehicle from the global positioning system source;
the global positioning system subassembly further has a global positioning system antenna in communication with the global positioning system receiver and the global positioning system source, wherein the global positioning system antenna receives speed information of the vehicle from the global positioning system source, the antenna transmits the speed information to the global positioning system receiver;
the speedometer system is powered via a power source being at least one of vehicle power input, vehicle wiring, vehicle accessory assembly, and a battery; and
providing a calibration unit, the calibration unit being in connection with the microcontroller to initiate the electric motor to spin to a pre-set revolutions per minute and thereby displaying a speed on the speedometer; providing power to calibration unit; if the speed displayed on speedometer is different from a pre-determined calibration speed, then the calibration unit may manipulate the revolutions per minute of the electric motor to a calibrated revolutions per minute of the electric motor, the calibrated revolutions per minute of the electric motor being when the pre-determined speed is displayed on the speedometer.

2. The speedometer system of claim 1, wherein the global positioning system subassembly further includes a global positioning system antenna in communication with both the global positioning system receiver and the global positioning system source, wherein the antenna receives the location information of the vehicle from the global positioning system source and transmits the location information of the vehicle to the global positioning system receiver.

3. The speedometer system of claim 1, further comprising a gear box, the gear box being connected to the electric motor on a first end and the connection on a second end, such that the correlated revolutions per minute of the electric motor is reduced by the gear box.

4. The speedometer system of claim 1, further comprising a rotary encoder, the rotary encoder being connected with the electric motor and the microcontroller, the rotary encoder measures revolutions per minute of the electric motor and communicates this in feedback to the microcontroller.

5. The speedometer system of claim 1, further comprising a calibration unit, the calibration unit being in connection with the microcontroller that communicates to the electric motor to spin to a pre-set revolutions per minute, and wherein the calibration unit allowing for the manipulation of revolutions per minute of the electric motor to a calibrated revolutions per minute.

6. The speedometer system of claim 3, further comprising memory for saving information of the calibrated revolution per minute.

7. The speedometer system of claim 3, wherein the calibration unit is wirelessly connected to electric motor.

8. The speedometer system of claim 1, further comprising a plastic cap, the plastic cap covering a connection point on the vehicle, the connection point being located where the speedometer cable was originally to the vehicle.

9. A speedometer system method comprising the steps of:
providing a module with a housing having a connection, the connection coupled to a speedometer of a vehicle; an electric motor coupled to the connection; and a speed information source communicating speed information of the vehicle with a microcontroller, the microcontroller driving the electric motor to spin the electric motor at a correlated revolutions per minute, the correlated revolutions per minute correlates with the speed information of the vehicle, and wherein the speedometer displays a speed of the vehicle from the correlated revolutions per minute of the electric motor;
mounting the speedometer module;
removing at least a portion of speedometer cable from vehicle transmission;
connecting speedometer cable to speedometer module;
the connection is configured for receipt of a speedometer cable, the speedometer cable being connected directly to the speedometer of the vehicle;
the speed information source is a global positioning system subassembly having a global positioning system receiver in communication with a global positioning system source, the global positioning system receiver being connected to the microcontroller, the global positioning system receiver determining speed information of the vehicle from the global positioning system source;
the global positioning system subassembly further has a global positioning system antenna in communication with the global positioning system receiver and the global positioning system source, wherein the global positioning system antenna receives speed information of the vehicle from the global positioning system source, the antenna transmits the speed information to the global positioning system receiver;

the speedometer system is powered via a power source being at least one of vehicle power input, vehicle wiring, vehicle accessory assembly, and a battery; and providing a calibration unit, the calibration unit being in connection with the microcontroller to initiate the electric motor to spin to a pre-set revolutions per minute and thereby displaying a speed on the speedometer; providing power to calibration unit; if the speed displayed on speedometer is different from a pre-determined calibration speed, then the calibration unit may manipulate the revolutions per minute of the electric motor to a calibrated revolutions per minute of the electric motor, the calibrated revolutions per minute of the electric motor being when the pre-determined speed is displayed on the speedometer.

10. The speedometer system method of claim 1, further comprising the step of: supplying power to the speedometer module.

11. The speedometer system method of claim 1, further comprising the step of: providing a cap to cover a connection point on the vehicle transmission where the speedometer cable was connected.

12. The speedometer system method of claim 9, further comprising the step of: providing a memory source for saving the calibrated revolution per minute of the electric motor.

* * * * *